US012435539B2

(12) United States Patent
Ayre et al.

(10) Patent No.: US 12,435,539 B2
(45) Date of Patent: Oct. 7, 2025

(54) ENERGY SOURCE ACCESS IN A LOCK

(71) Applicant: CODELOCKS LIMITED, Newbury (GB)

(72) Inventors: Michael Edwin Ayre, Wantage (GB); Martin James Clayton, Newbury (GB); Dominic Michael Ryan, Newbury (GB)

(73) Assignee: Codelocks International Limited, Newbury (GB)

( * ) Notice: Subject to any disclaimer, the term of this patent is extended or adjusted under 35 U.S.C. 154(b) by 105 days.

(21) Appl. No.: 18/285,839

(22) PCT Filed: Mar. 24, 2022

(86) PCT No.: PCT/GB2022/000035
§ 371 (c)(1),
(2) Date: Oct. 5, 2023

(87) PCT Pub. No.: WO2022/214774
PCT Pub. Date: Oct. 13, 2022

(65) Prior Publication Data

US 2024/0183190 A1 Jun. 6, 2024

(30) Foreign Application Priority Data

Apr. 6, 2021 (GB) ..................................... 2104866

(51) Int. Cl.
*E05B 9/00* (2006.01)
*E05B 47/00* (2006.01)

(52) U.S. Cl.
CPC .......... *E05B 9/002* (2013.01); *E05B 47/0001* (2013.01); *E05B 2047/0058* (2013.01)

(58) Field of Classification Search
CPC ........ E05B 9/00; E05B 9/002; E05B 47/0001; E05B 2047/0058; Y10T 70/7068
(Continued)

(56) References Cited

U.S. PATENT DOCUMENTS 5,701,828 A 12/1997 Benore et al.
5,887,467 A 3/1999 Butterweck et al.
(Continued)

FOREIGN PATENT DOCUMENTS

CA 2653935 A1 12/2007
CA 2944556 A1 12/2007
(Continued)

OTHER PUBLICATIONS

International Search Report Mailed Jul. 19, 2022 in International Application PCT/GB2022/000035 filed Mar. 24, 2022.
(Continued)

*Primary Examiner* — Suzanne L Barrett
(74) *Attorney, Agent, or Firm* — Shook, Hardy & Bacon L.L.P.

(57) ABSTRACT

A surface-mounted keylessly operated lock (10) comprises a chassis (11) mountable on one of two parts, especially a door and a door surround, to be locked and unlocked relative to one another and carrying locking means (17 to 23) transferrable between a locking state and an unlocking state respectively for the locking and unlocking, the locking means being electrically operable to cause or allow transfer from the locking state to the unlocking state. In addition, the lock includes a control module (16) mounted on the chassis (11) and carrying control means (30) for controlling supply of electrical operating power to the locking means. The chassis has a receptacle (25) for reception of an electrical energy source, especially batteries, for providing the operating power and the module (16) inclusive of the control means (20) is movable relative to the chassis (11) to permit access to the receptacle (25) to enable battery exchange without demounting of the installed lock.

19 Claims, 2 Drawing Sheets

(58) Field of Classification Search
USPC .......................................................... 70/278.7
See application file for complete search history.

(56) References Cited

U.S. PATENT DOCUMENTS

| | | | | |
|---|---|---|---|---|
| 6,378,344 | B1 | 4/2002 | Gartner | |
| 6,640,594 | B1 | 11/2003 | Yao | |
| 8,490,443 | B2 | 7/2013 | Gokcebay | |
| 8,495,898 | B2 | 7/2013 | Gokcebay | |
| 9,208,628 | B2 | 12/2015 | Gokcebay | |
| 9,273,492 | B2 | 3/2016 | Gokcebay | |
| 9,536,359 | B1 | 1/2017 | Gokcebay | |
| 10,909,789 | B2 | 2/2021 | Gokcebay | |
| 10,930,099 | B2 | 2/2021 | Gokcebay | |
| 2007/0277571 | A1 | 12/2007 | Gokcebay | |
| 2018/0016810 | A1* | 1/2018 | Bacon | E05B 81/66 |
| 2021/0225105 | A1 | 7/2021 | Gokcebay | |
| 2022/0259893 | A1* | 8/2022 | Denison | E05B 63/0056 |
| 2023/0245513 | A1* | 8/2023 | LeBlanc | G07C 9/00904 340/5.64 |
| 2024/0252811 | A1* | 8/2024 | Ayre | A61M 60/165 |

FOREIGN PATENT DOCUMENTS

| | | | | |
|---|---|---|---|---|
| CN | 107476671 | A | 12/2017 | |
| CN | 107795195 | A * | 3/2018 | |
| CN | 115142740 | A * | 10/2022 | E05B 17/22 |
| DE | 20114081 | U1 | 1/2003 | |
| DE | 112007001299 | B4 | 12/2018 | |
| EP | 0721036 | A1 | 7/1996 | |
| EP | 1178167 | A1 | 2/2002 | |
| EP | 2323106 | A2 * | 5/2011 | E05B 41/00 |
| EP | 2551427 | A2 * | 1/2013 | E05B 47/0665 |
| EP | 4261367 | A1 * | 10/2023 | E05B 47/0012 |
| ES | 2333637 | A1 | 2/2010 | |
| GB | 0721036 | A1 | 7/1996 | |
| GB | 2451988 | A | 2/2009 | |
| GB | 2490503 | A | 11/2012 | |
| WO | 2014186475 | A1 | 11/2014 | |

OTHER PUBLICATIONS

International Preliminary Report on Patentability received for PCT Patent Application No. PCT/GB2022/000035, mailed on Oct. 19, 2023, 7 pages.

* cited by examiner

ENERGY SOURCE ACCESS IN A LOCK

CROSS-REFERENCE TO RELATED APPLICATIONS

This application claims priority under 35 U.S.C. § 365 to PCT/GB2022/000035 filed on Mar. 24, 2022, entitled "Energy Source Access in a Lock," and United Kingdom Patent Application No. 2104866.5, filed Apr. 6, 2021, entitled "Energy Source Access in a Lock." The entirety of the aforementioned applications are incorporated herein by reference.

The present invention relates to a lock and has particular reference to energy source access in a lock.

Surface-mounted mechanical, electromechanical, electrical and electronic locks exist in a wide variety of forms for use in the latching of doors or other closures to surrounds. A popular form of lock in widespread use for multi-user operation without the inconvenience of needing to supply keys to all users is a code-controlled lock with control means in the form of actuating elements such as press buttons, which can be operated in a set sequence—representing a numeric code—to release a fastening, in particular latching, mechanism of the lock and allow door opening. Such a lock is of compact construction and has the actuating elements arranged at an accessible external side, which may also carry a handle for fastening mechanism operation. If the lock is electromechanical or essentially electrical in nature then necessary electrical operating power can be provided by a mains or, more usually, an individual energy source such as one or more batteries. Batteries periodically require recharging or replacing. Due to the compact nature of such locks, batteries have to be accommodated within the lock and access for recharging, replacing or even initial installation in the case of a mounted lock represents a problem due to the occupation of much of the external area of the lock by the actuating elements, of which there may be ten or more in the case of buttons offering a ten-digit code, and a handle when present. Current practice in locks of this kind is to install the energy source in a compartment accessible at a face of the lock remote from the side with the actuating elements, thus at the face which, in the case of a surface-mounted lock, serves as a mounting face. Consequently, access to the energy source requires demounting of the lock, which is a laborious and sometimes complicated procedure, particularly since the lock may have components on both sides of a door and a connecting shaft passing through the door.

It is therefore the principal object of the present invention to provide a lock which is of such a construction that access to an energy source when the lock is fitted does not require demounting.

Other objects and advantages of the invention will be apparent from the following description.

According to the present invention there is provided a lock comprising a chassis mountable on one of two parts to be locked and unlocked relative to one another and carrying locking means transferrable between a locking state and an unlocking state respectively for the locking and unlocking, the locking means being electrically operable to cause or allow transfer from the locking state to the unlocking state, and a control module mounted on the chassis and carrying control means for controlling supply of electrical operating power to the locking means, the chassis having a receptacle for reception of an electrical energy source for providing the operating power and the control module inclusive of the control means being so movable relative to the chassis and to said electrical energy source when received in the receptacle of the chassis as to permit access to the receptacle and the electrical energy source therein.

A lock embodying the present invention allows a convenient means of access to an installed on-board or integrated power source even when the lock is mounted in a use location, thus access without lock removal. The access can be such as to enable removal of the source and replacement or—if the source is rechargeable—recharging at a mains supply. Reinstatement of the source, typically a pair of batteries, can be carried out by a reverse procedure. By contrast to prior art locks of the relevant kind the lock is divided into a chassis with the locking means and a movable module with control means for controlling the locking means, in particular the supply of operating power to the locking means. The lock casing is no longer a single unit, but has a multi-component construction with separation into a component which has to remain stationary at one of two parts to be locked and unlocked relative to one another, such as a door, and a component which can be moved. In departure from usual prior art locks, the space issue represented by the area occupied by the control means is resolved by incorporating the control means into the module, thus the movable component, rather than being left as part of the fixed component. In practice, the control means can be a lightweight control arrangement electrically connected with an energy source, when present in the receptacle of the chassis, by an appropriate connection accommodating the relative movement of module and chassis.

The movement of the module can be in the form of a pivoting or swivelling motion, lifting-off or unplugging, or other suitable action, but in a preferred construction compatible with a typical elongate shape of a surface-mounted lock of the kind in question the module is slidable relative to the chassis. This is an intuitive movement for a user of electrical or electronic devices and uncomplicated to realise in a lock casing, here the chassis and module. In particular, the module can be mounted on the chassis by guide means for guidance of sliding movement of the module relative to the chassis, for example guidance provided by interengaging slideways respectively of the module and chassis. The interengagement ensures secure retention of the module in a normal use position, thus when access to the receptacle is closed off or barred. Advantageously, the capability of relative movement of the module and chassis is such that the module inclusive of the control means is entirely removable from the chassis, in which case completely unobstructed access to the receptacle may be able to be provided to facilitate energy source removal. Further, it is then possible to configure the lock so that the module is an exchangeable or replaceable part to allow repair in the case of faulty componentry of the control means or upgrading to provide improved or additional functions of the control means.

For preference the lock comprises releasable securing means for releasably securing the module against movement relative to the chassis, so that access to the energy source or undesired interference with the lock is prevented unless there is intentional release of the securing means. The securing means may be simply a threaded fastener, optionally with a security head requiring use of a special tool. However, the arrangement of the securing means can be such that release is prevented by the locking means in the locking state, for example by the securing means being covered by a handle of the locking means in the locking state. In that case, the securing means is concealed and susceptible to release only if there is knowledge of the location of the securing means and of the need to manipulate the handle to expose the securing means. The lock may include a facility for emergency operation of the handle in the event of failure of the energy source and a need to gain access to the securing means.

In a convenient solution to accommodate movement of the module, inclusive of the control means, relative to the chassis the chassis and module are preferably provided with mutually contacting electrical contacts in electrical paths between the control means and energy source connecting means in the receptacle, the contacts being separable to interrupt the paths on movement of the module relative to the chassis to permit access to the receptacle. An essential electrical connection between the control means on the one hand and energy source and an electrically operable component of the locking means on the other hand can thus be broken and reinstated in simple manner. The contacts can be of any suitable form depending on the nature of relative movement of the module and chassis; in the case of, in particular, sliding or swivelling movement, the contacts can be sliding wiper contacts able to slide relative to one another during separation. Security of electrical contacting can be ensured in advantageous manner if the contacts when in mutual contact are resiliently urged against one another, in which case either or each of the contacts of a co-operating pair can be formed to be resiliently yielding.

In a preferred construction of the lock the control means may comprise a plurality of control elements selectively actuable in a predeterminable sequence to provide correspondingly sequential transmission of signals for triggering transfer of the locking means from the locking state to the unlocking state. Sequential actuation of individual control elements each assigned, for example, a respective number represents a proven basis for a code-operated lock. The input of a code by way of signals in the case of electrically operable locking means rather than by way of mechanical actuators in the case of a purely mechanical lock is compatible with location of the control elements on a module which is designed to be movable relative to the chassis and thus relative to the locking means carried by the chassis. A mechanical connection between the control means and the locking means does not have to be provided. The control means may accordingly comprise electronic means responsive to the signals to cause or allow supply of operating power to the locking means, in which case input of code signals from the control elements and processing of those signals to enable operating power supply can be performed entirely within the module, which significantly simplifies the extent of electrical connection necessary between the module and chassis. The electronic means preferably comprise a printed circuitboard, particularly with a capability to store codes and recognise signal inputs corresponding with a stored code. The control elements themselves may comprise buttons, especially push buttons which for signal output can be depressed against a resilient bias, which can be provided in a compact unitary form by a substrate sheet of elastomeric material acting on all buttons. The buttons can be arranged in a matrix at a face of the module in a manner typical of electromechanical, electrical or electronic locks, the module being able to offer as much space to accommodate such a matrix as the lock casing of prior art locks.

For preference the locking means comprise fastening means transferrable between a fastening state and a release state respectively representing the locking state and the unlocking state of the locking means, and blocking means for blocking transfer of the fastening means from the fastening state to the release state, the blocking means being electrically operable to cancel the blocking. Whilst is entirely possible to provide electrical drive of locking means components for various functions, a particularly simple construction is realised by arranging the drive to merely block and unblock the performance of a release function. In that case the blocking means may advantageously comprise a displaceable blocking member for blocking the transfer and an electric motor for causing or allowing displacement of the blocking member to cancel the blocking, the motor being operable by the operating power when supplied to the locking means. The blocking member can be of any suitable form, for example a pin to block rotation of a rotary component of the locking means. Apart from the unblocking function, the fastening means can otherwise be manually operable for transfer between the fastening and release states. However, in a more developed form of the lock, transfer by way of an electrical drive is equally possible.

A preferred embodiment of the present invention will now be more particularly described by way of example with reference to the accompanying drawings, in which.

Figure 1:
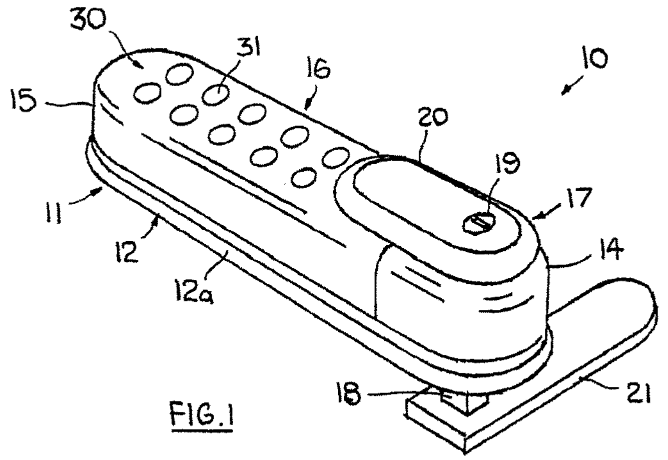
FIG. 1 is a schematic perspective view of a lock embodying the present invention, the lock comprising a chassis and a module mounted on the chassis to be movable relative thereto.

Referring now to the drawings there is shown a compact, surface-mounted, keylessly operated electromechanical lock 10 with an electronically controlled, electrically and manually operable locking mechanism, the lock being particularly suitable for locking and unlocking a door, especially a door of a cabinet or a locker, relative to a surround.

Figure 4:
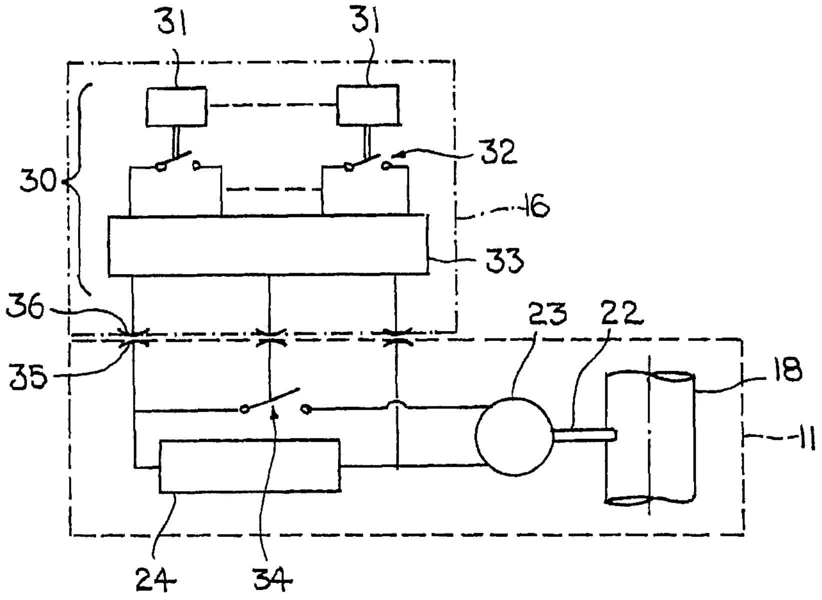
FIG. 4 is a schematic circuit diagram of the lock of FIG. 1.

The lock 10 comprises an elongate chassis 11 composed of a metal mounting plate 12, of which only a peripheral edge bead **12*a* is visible in the figures and which is mountable on a face of a door with an interposed gasket, and a metal body 13 in the form of a shallow housing open at a side remote from the mounting plate 12. The open side is covered in one end region of the body 13 over about one third of the body length by a fixed cap 14 and in the remaining region of the body by a cover 15 which is part of a module 16 constructed as a component separate from the chassis 11, as described further below. In FIG. 4 the chassis 11 is indicated by a dashed line and the module 16** by a chain-dotted line.

The chassis 11 carries the locking mechanism, which comprises fastening means 17 transferrable between a fastening state for fastening a door on which the lock is mounted to the rim of a door surround or catch on the surround and a release state for release of the door from the surround. The fastening means 17 comprises a rotary shaft assembly 18 which is accommodated primarily within the cap 14 and which optionally contains a key-operated barrel 19 for an ancillary purpose mentioned further below. One end portion of the shaft assembly 18 projects out of the cap 14 and carries a handle 20 secured against rotation relative to the shaft assembly and the other end portion of the shaft assembly projects through the body 13 and mounting plate 12 of the chassis as well as, when the lock 10 is mounted on a door, through an aperture in the door and carries a fastening arm 21 which functions as a catch or latch and which is similarly secured against rotation relative to the shaft assembly. For preference the projecting other end portion of the shaft assembly 18 has a square section receivable in a square opening of the arm 21 to provide the security against relative rotation. The arm 21 is intended to be located on a side of the door, in particular a designated inner side in relation to the interior of a cabinet or locker closable by the door, opposite to a side of the door where the lock chassis 11 is to be mounted. Accordingly, the arm 21 can be supplied as a component separate from the rest of the lock 10 and intended to be fitted to the shaft assembly 18 only after mounting of the chassis. The arm 21 is intended to engage, for example, the rim of a door surround to provide fastening and disengage from the rim to provide release. Transfer between the fastening and release states is achieved by manual rotation of the shaft assembly 18 and arm 21 by the handle 20. Rotation may be possible in clockwise or anticlockwise sense and the lock 10 can be mounted on a door in the vicinity of a free side edge, which can be a lefthand or righthand side edge, opposite a hinged side edge. The orientation of the arm 21 on the shaft assembly 18 can be selected in accordance with lock location.

The locking means further comprises a blocking member 22 in the form of a slide which is engageable with the shaft assembly 18 to block its rotation, in particular rotation to release the arm 21, and which is disengageable from the shaft assembly to permit rotation. The blocking member 22 thus inhibits transfer of the fastening means 17 from the fastening state to the release state. The blocking member 22 is disengageable from the shaft assembly 18 by way of an electric motor 23 coupled to the blocking member via a clutch and a motor-displaceable component causing or allowing sliding movement of the member. The blocking member 22 and the motor 23 are schematically indicated in FIG. 4, but not shown in FIGS. 1 to 3.

Operating current for the motor 23 is provided by an energy source in the form of, for example, two serially connected 1.2 volt dry cell batteries 24 of conventional cylindrical form, the batteries in this instance being non-rechargeable consumables and therefore not components of the lock as such. The batteries 24 are accommodated in a receptacle 25 of the chassis 11. The receptacle may be simply a receiving space, but preferably comprises a battery cradle 26 with contact terminals 27, which are contactable with contact terminals of the batteries 24 when inserted in the cradle, and springs (not shown) to locate the batteries in the cradle by urging them against the terminals 27 and at the same time to ensure good electrical contact. The cradle 26 is open towards the open side of the chassis body 13 so that the batteries are exposed towards that side.

Figure 3:
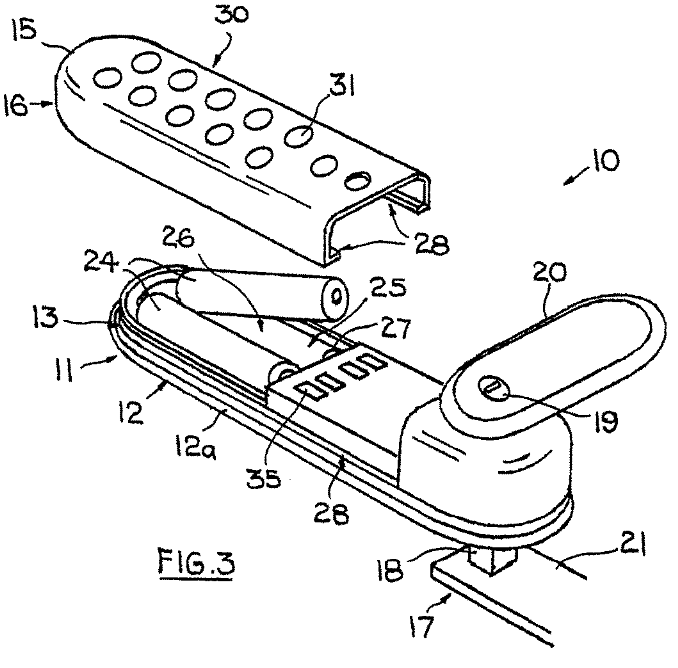
FIG. 3 is a view similar to FIG. 2, but showing the module separated from the chassis and a battery in the course of removal from the chassis.

The module 16 is mounted on the chassis 11 to be slidably movable relative thereto to afford access to the batteries 24 in the receptacle 25, for which purpose the mentioned cover 15 of the module and the body 13 of the chassis 11 are interengaged at slideways 28 (not shown in detail) represented by mutually parallel beaded or flanged longitudinal edges of the cover and corresponding channels of the body. The channels have re-entrant grooves for sliding reception of the beads or flanges and thus retention of the cover 15 on the body 13 through preventing separation of the module 16 from the chassis 11 by movement perpendicularly to the direction of the slideways 28. The sliding movement of the module 16 relative to the chassis 11 covers a range sufficient to permit complete removal of the module from the chassis as shown in FIG. 3. Movement of the module is prevented by a releasable securing device, in this embodiment a securing screw 29, which passes through the cover 15 and is screwed into a pedestal at the body 13 of the chassis.

In the position of the handle 20 shown in FIG. 1, thus the fastening state of the fastening means 17, the handle 20 covers and thus conceals the screw 29 when the latter is in place. Consequently, the lock 10 also incorporates an emergency release facility, which can be employed in the event of discharged batteries, so that the shaft assembly 18 can be unblocked to permit turning of the handle 20 and exposure of the screw 29. Such a facility can be, for example, subsidiary terminals contactable externally of the lock by a suitable substitute power source and/or by the key-operated barrel 19 which, when turned by a key, uncouples a part of the shaft assembly 18 fitted with the handle 20 from a part of the assembly co-operable with the blocking member 22, so that the handle can then be rotated.

Figure 2:
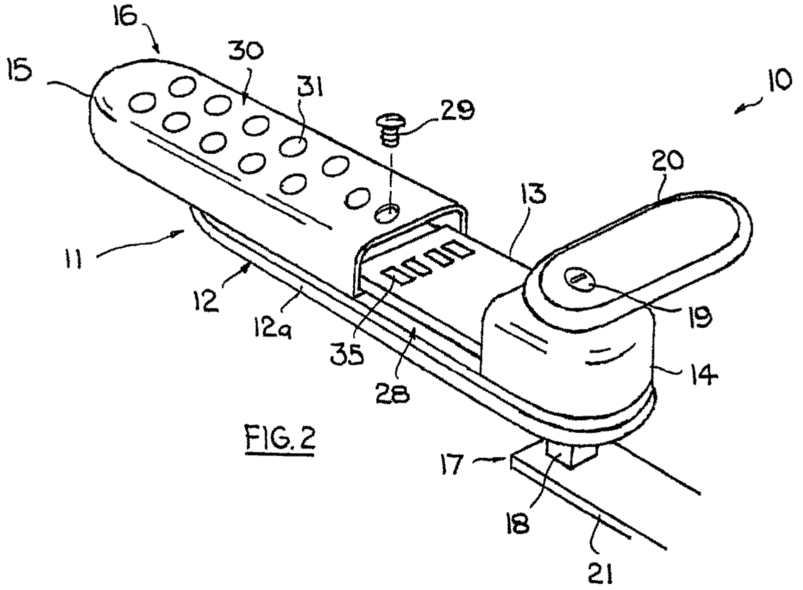
FIG. 2 is a view similar to FIG. 1, but showing the module in the course of movement relative to the chassis.

The module 16 carries control means 30 for controlling the locking means, in particular operation of the motor 23 inclusive of motor clutch. The control means 30 is accommodated in the cover 15 of the module 16 and comprises a plurality of control elements, in particular push buttons 31, resiliently biased to protrude into respective openings in the cover, but restrained from escaping through the openings, respectively associated switches 32 actuable by the buttons to provide code signals individually characteristic of the buttons, and an electronic control unit 33 for processing the signals. The control unit 33 comprises a printed circuitboard which is connectible at a power input and a power output with the batteries 24 via the cradle contact terminals 27 and which carries electronic components for signal processing and, depending on the result of the processing, output of a control signal for activation of the motor 23 and clutch of the locking means, as schematically shown in FIG. 4 by way of a relay 34 located in a power feed to the motor and activatable by the control signal. In accordance with established practice with button-operated locks, an individual numeral from 0 to 9 is assigned to each of ten buttons 31 of the plurality and a selected code number of, usually, four digits is input into and stored by the control means 30. Actuation of the buttons 31 assigned to the numerals corresponding with those of the stored code number and in the sequence inherent in the code number leads to generation via the switches 32 of corresponding code signals which, when recognised by the control unit 33 as matching the stored code number, cause output of the control signal. The ten buttons 31 are arranged in a matrix of two parallel rows as shown in FIGS. 1 to 3 and a further button 31 associated with selection of the code number is arranged outside the matrix to be concealed by the handle 20 in similar manner to the securing screw 29, so that the code number is settable or resettable only when the fastening means is in the release state. The precise nature of the control means 30, which can correspond with a known arrangement and accordingly is not described in more detail, can vary and its specifics are not the concern of the present invention.

In order to transfer current between the control means 30 at the module 16 and electrical components at the chassis 11 the chassis has a set of first contacts 35, in this example four, and the module 16 has a corresponding set of second contacts 36 (not visible in FIGS. 1 to 3) respectively co-operable with the first contacts 35, the contacts 36 of the module being disengageable from and re-engageable with those of the chassis when the module is moved relative to the chassis to, respectively, provide and prevent access to the batteries 24. The contacts are constructed as sliding wiper contacts and those of at least one of the sets can be resilient spring elements to ensure firm contact interengagement and hence secure electrical contact-making. The contacts 35, 36 provide a simple means of achieving current transfer while accommodating relative movement of the module 16 and chassis 11.

When the module 16 is moved sufficiently relative to the chassis 11 to expose the battery cradle 24 and consequently, in use of the lock 10, batteries 24 fitted in the cradle or—if permitted, as is the case with the present embodiment of the lock—the module is entirely removed from the chassis, in either case after removing the securing screw 29, the batteries can be released from retention in the cradle and removed for replacement. Discharged batteries can thus be replaced without the inconvenience of demounting the lock as required with conventional locks. A particular feature making this possible is division of the lock 10 into a chassis fixable to a door or other support surface and a module which is movably mounted on the chassis, but which incorporates the control means 30 for controlling lock operation. The control elements, particularly buttons 31, of the control means can be presented to a user in a customary position with maximum utilisation of the front area of the lock so as to maintain the compact size of the lock.

The invention claimed is:

1. A lock comprising:
- a chassis mountable on one of two parts to be locked and unlocked relative to one another;
- locking means carried by the chassis and transferrable between a locking state and an unlocking state respectively for the locking and unlocking, the locking means being electrically operable to cause or allow transfer from the locking state to the unlocking state;
- a control module mounted on the chassis; and
- control means carried by the control module and operable to control supply of electrical operating power to the locking means,
- wherein the chassis defines a receptacle for reception of an electrical energy source for providing the operating power, and
- wherein the control module inclusive of the control means is movable relative to the chassis and to said electrical energy source when received in the receptacle of the chassis so as to permit access to the receptacle and the electrical energy source therein.

2. The lock according to claim 1, wherein the control module is slidable relative to the chassis.

3. The lock according to claim 2, further comprising guide means mounting the control module on the chassis for guidance of sliding movement of the control module relative to the chassis.

4. The lock according to claim 3, the guide means comprising interengaging slideways respectively of the control module and chassis.

5. The lock according to claim 1, wherein the control module inclusive of the control means is removable from the chassis by the movement relative thereto.

6. The lock according to claim 1, comprising releasable securing means for releasably securing the control module against movement relative to the chassis.

7. The lock according to claim 6, wherein release of the securing means is prevented by the locking means in the locking state.

8. The lock according to claim 7, wherein the locking means comprises a handle which covers the securing means in the locking state.

9. The lock according to claim 1, wherein the chassis and control module are provided with mutually contacting electrical contacts in electrical paths between the control means and energy source connecting means in the receptacle, the contacts being separable to interrupt the paths on movement of the control module relative to the chassis to permit access to the receptacle.

10. The lock according to claim 9, wherein the contacts are sliding wiper contacts.

11. The lock according to claim 10, wherein the contacts when in mutual contact are resiliently urged against one another.

12. The lock according to claim 1, the control means comprising a plurality of control elements selectively actuable in a predeterminable sequence to provide correspondingly sequential transmission of signals for triggering transfer of the locking means from the locking state to the unlocking state.

13. The lock according to claim 12, the control means comprising electronic means responsive to the signals to cause or allow supply of operating power to the locking means.

14. The lock according to claim 13, the electronic means comprising a printed circuitboard.

15. The lock according to claim 12, wherein the control elements comprise buttons.

16. The lock according to claim 15, wherein the buttons are arranged in a matrix at a face of the control module.

17. The lock according to claim 1, the locking means comprising fastening means transferrable between a fastening state and a release state respectively representing the locking state and the unlocking state of the locking means, and blocking means for blocking transfer of the fastening means from the fastening state to the release state, the blocking means being electrically operable to cancel the blocking.

18. The lock according to claim 17, the blocking means comprising a displaceable blocking member for blocking the transfer and an electric motor for causing or allowing displacement of the blocking member to cancel the blocking, the motor being operable by the operating power when supplied to the locking means.

19. The lock according to claim 17, the fastening means being manually operable.

* * * * *